(12) United States Patent
Yamazaki

(10) Patent No.: US 7,044,501 B2
(45) Date of Patent: May 16, 2006

(54) INFLATOR

(75) Inventor: Masayuki Yamazaki, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 150 days.

(21) Appl. No.: 10/462,657

(22) Filed: Jun. 17, 2003

(65) Prior Publication Data

US 2004/0046374 A1    Mar. 11, 2004

Related U.S. Application Data

(60) Provisional application No. 60/393,731, filed on Jul. 8, 2002.

(30) Foreign Application Priority Data

Jun. 17, 2002 (JP) ............................. 2002-175926

(51) Int. Cl.
B60R 21/26 (2006.01)
(52) U.S. Cl. ................ 280/737; 280/741; 280/742
(58) Field of Classification Search ................ 280/736, 280/737, 741, 742
See application file for complete search history.

(56) References Cited

U.S. PATENT DOCUMENTS

| | | | | | |
|---|---|---|---|---|---|
| 5,242,194 | A | * | 9/1993 | Popek | 280/737 |
| 5,257,819 | A | * | 11/1993 | Frantom et al. | 280/737 |
| 5,351,989 | A | * | 10/1994 | Popek et al. | 280/737 |
| 5,602,361 | A | * | 2/1997 | Hamilton et al. | 102/288 |
| 5,882,036 | A | * | 3/1999 | Moore et al. | 280/736 |
| 6,010,153 | A | * | 1/2000 | Halas et al. | 280/737 |
| 6,062,599 | A | | 5/2000 | Forbes et al. | |
| 6,095,556 | A | * | 8/2000 | Bailey et al. | 280/737 |
| 6,217,065 | B1 | | 4/2001 | Al-Amin et al. | |
| 6,231,078 | B1 | * | 5/2001 | Kokeguchi | 280/736 |
| 6,244,622 | B1 | * | 6/2001 | Al-Amin et al. | 280/737 |
| 6,338,500 | B1 | * | 1/2002 | Perotto | 280/741 |
| 6,412,811 | B1 | * | 7/2002 | Campbell et al. | 280/730.2 |
| 6,557,890 | B1 | * | 5/2003 | Karlin et al. | 280/741 |

FOREIGN PATENT DOCUMENTS

| | | |
|---|---|---|
| EP | 1075988 A2 | 2/2001 |
| JP | 2001-71857 A | 3/2001 |

* cited by examiner

Primary Examiner—Paul N. Dickson
Assistant Examiner—Laura B. Rosenberg
(74) Attorney, Agent, or Firm—Birch, Stewart, Kolasch & Birch, LLP

(57) ABSTRACT

An inflator for safety system for a vehicle includes: an inflator housing having a gas discharging port, the inflator housing accommodating a pressurized medium accommodation chamber charged with a pressurized medium, and an igniter chamber for accommodating an igniter; a first retainer defining, therein, a first passage for guiding an activation energy of the igniter towards the pressurized medium accommodation chamber, and defining, outside thereof, a second passage, for guiding the pressurized medium to the gas discharging port; a second retainer arranged in alignment with the first cylindrical peripheral wall portion and defining, therein, the first passage, and defining, outside thereof, the second passage; and a single rupturable plate extending through a communicating space, formed between opposing ends of the first retainer and the second retainer and communicating the first passage with the second passage, for sealing the pressurized medium accommodation chamber from the igniter chamber and the discharging port.

20 Claims, 5 Drawing Sheets

US 7,044,501 B2

INFLATOR

This nonprovisional application claims priority under 35 U.S.C. § 119(e) on U.S. Provisional Application No. 60/393,731 filed on Jul. 8, 2002 and under 35 U.S.C. § 119(a) on Patent Application No. 2002-175926 filed in Japan on Jun. 17, 2002, which are herein incorporated by reference.

BACKGROUND OF THE INVENTION

1. Field of the Invention

The present invention relates to an inflator for an inflating type safety system of a vehicle, and in particular, to an inflator which can reliably discharge a gas for inflating an air bag and does not have a complicated structure, and in which a gas to be discharged is clean, i.e. containing substantially no combustion residue.

2. Description of Related Art

In the development of inflators for an inflating-type safety system for motor vehicles, hybrid inflators using both a pressurized gas and a gas generating agent has been attracting attention, and such a hybrid inflator inflates an air bag by discharging a pressurized gas in a sealed state.

Such an inflating-type safety system for vehicles is required to activate reliably as needed, and naturally, an inflator used therein is also required to activate reliably.

In particular, in an inflator using a pressurized gas, it is necessary to reliably activate a mechanism for releasing the pressurized gas charged and sealed in an interior of a housing in order to assure its operation reliability. In many cases, a rupturable plate is used as a sealing member for sealing a pressurized gas, and the sealed state is broken by rupturing the rupturable plate. Then, the pressure in a pressurized gas accommodation chamber is raised by a flame (or heat, hereinafter, used in the same manner) or a gas generated by combustion of a solid gas generating agent. The rupturable plate is broken by a projectile, an impact wave, a flame, a gas or the like generated at a time of activation of an igniter. Among them, it is particularly desirable to use an impact wave, a flame, a gas or the like generated at a time of activation of an igniter for reducing weight of the inflator due to its simple constitution, and there have conventionally been various proposals for the structures of such an inflator.

For example, a technique in which an inlet for guiding a combustion product (an impact wave, a flame, a gas or the like) generated by activation of an igniter, into an interior of a pressurized medium accommodation chamber, and an outlet for guiding a pressurized gas in the pressurized medium accommodation chamber to a gas discharging port or passage are covered by a single rupturable plate which is ruptured by activation of an igniter, is disclosed in U.S. Pat. No. 6,217,065. The disclosure thereof describes a state in which a rupturable plate is deformed to bulge towards the igniter by receiving pressure from the pressurized medium before activation. However, in the art disclosed in this document, only a peripheral portion of the rupturable plate is fixed by welding, and thus, a welding radius becomes necessarily large. As a result, even if the igniter is activated, the rupturable plate is not reliably ruptured in that it must substantially change its original shape to be bulged or deformed toward the opposite direction.

Further, U.S. Pat. No. 6,062,599 discloses an inlet and an outlet opening in communication with a pressurized gas chamber covered by a single rupturable plate by welding the rupturable plate at two portions and scoring the rupturable plate to form fragile portions. As a result, manufacturing cost is increased since an extra welding step is required, and it is necessary to provide the fragile scored portions in the rupturable plate.

In inflators using pressurized gas, it is desirable to discharge the gas efficiently in order to inflate an air bag rapidly at a time of activation, and therefore it is important that an interior structure of an inflator housing is designed to obtain an efficient gas flow in the housing. Particularly, in a hybrid inflator using a flame or a gas generated by combustion of a solid gas generating agent, it is important to obtain an effective gas flow in view of efficiently using a flame or a gas generated by combustion of the gas generator.

Further, since a gas generated by combustion of the gas generating agent at a time of activation of the hybrid inflator has a high temperature, desirably, the hybrid inflator is formed such that a gas generated by combustion of the gas generating agent is not discharged directly, for improving a safety at activation. Then, a solid combustion product (combustion residue) generated by combustion of the gas generating agent has also a high temperature and there is a concern that an air bag (a bag body) may be damaged when the gas is discharged directly into the air bag. Therefore, it is desirable that such a combustion residue is prevented from directly flowing out of the housing with a flow of an operating gas for inflating the air bag. In other words, desirably, a gas to be discharged outside the housing will be clean, including little residue.

Since an inflator having a complicated structure increases the number of manufacturing steps and manufacturing cost, and an inflator having an increased volume causes inconvenience due to increased space requirements, it is necessary to avoid complicated inflator structures and increased size thereof.

However, with respect to inflators for inflating type safety systems for vehicles which activate air bags effectively, namely which not only inflate air bags to predetermined sizes in predetermined times, but also secure reliability of operation or activation if required, and that facilitate manufacturing, there is still room for development.

SUMMARY OF THE INVENTION

The present invention provides an inflator for an inflating type safety system having a simple structure and realizing reduction in size and weight, in which, even though it has a simple structure, a rupturable plate can be reliably ruptured in order to reliably discharge a gas for inflating an air bag, and even when a gas generating agent is used, a flame or a gas generated by combustion of a gas generating agent can further be utilized without discharging combustion residue therefrom and an air bag system using the same.

The present invention provides an inflator which can discharge a gas for inflating an air bag efficiently, and can utilize a flame or a gas generated by combustion thereof even when using a gas generating agent, and wherein a flow path ("a first flow path" hereinafter) for guiding an activation energy of an igniter for starting activation of the inflator and a flow path ("a second flow path" hereinafter) for guiding a gas for inflating an air bag are formed to improve reliability of the inflator upon an activation. A rupturable plate for closing the first flow path and the second flow path is interposed between two retainers defining both the flow paths and fixed securely there between such energy generated by activation of the igniter can be transmitted to the rupturable plate efficiently.

That is, the inflator according to the present invention is an inflator for an inflating type safety system for a vehicle, provided with a pressurized medium accommodation chamber charged with a pressurized medium and an igniter chamber partitioned from the pressurized medium in an inflator housing having a gas discharging port, wherein a first passage for guiding activation energy of an igniter and a second passage for guiding the pressurized medium to the gas discharging port are defined, respectively, inside and outside two retainers arranged adjacent to each other in an axial direction, each having a substantially cylindrical peripheral wall portion, and a rupturable plate for sealing the pressurized medium space is interposed between and juxtaposed with substantially abutting ends of the two retainers.

The inflator of the present invention ruptures the rupturable plate by activation energy of the igniter, namely a flame, a gas or an impact wave generated by activation of the igniter. By rupturing the rupturable plate due to the activation energy of the igniter in this manner, an interior structure of the inflator can be made simpler and lighter in weight.

Then, the first passage for guiding an activation energy of the igniter is closed by a first rupturable portion of the rupturable plate existing in the first passage and held between the two retainers such that when activation energy from the igniter is received, the first rupturable portion is prevented from deforming and bulging away from the igniter by the retainers, and when such activation energy is received, the first rupturable portion is constrained to rupture in the vicinity of inner peripheral edges of the opposed ends of the retainers. That is, by limiting deforming or bulging of the entire rupturable plate toward the pressurized medium accommodation chamber by the retainers, the first rupturable portion can be reliably broken upon activation of the igniter.

As described above, since the inflator according to the present invention is constituted such that deforming or bulging of the rupturable plate is suppressed by the retainers at a time of actuation and the rupturable plate is ruptured by an activation energy of the igniter, even a rupturable plate which does not have a fragile portion such as a notch or the like can also be used as the rupturable plate. By using the rupturable plate which does not have a fragile portion such as a notch or the like, manufacturing cost can be reduced.

Therefore, according to the present invention, an inflator is provided in which the number of welded portions in the retainers can be reduced and the rupturable plate is ruptured reliably by activation energy of the igniter without providing a fragile portion in the rupturable plate. In order to rupture the first rupturable portion more reliably, it is desirable that the igniter act directly against the first rupturable portion with no obstacle between them.

The two retainers holding the above-described rupturable plate are formed to have substantially cylindrical peripheral wall portions, and are axially opposed to hold the rupturable plate therebetween. In this case, one of the retainers exists in the pressurized medium space defined by the rupturable plate and the other exists outside the pressurized medium space.

Further, desirably, the first passage and the second passage are provided substantially concentrically and both passages are defined by the retainers. By arranging the passages in this manner, a compact inflator can be realized and further the first passage and the second passage can be closed by a single member (the rupturable plate), and thus manufacturing can be made easier. If the rupturable plate is formed integrally such that a second rupturable portion exists to surround a periphery of the first rupturable portion, the rupturable plate can be manufactured easily, and consequently reduction in manufacturing cost can be achieved.

By defining the first passage and the second passage by the retainers, the first passage is provided inside the retainers and the second passage is provided outside the same. Both passages are defined by the two retainers without communication therebetween. Thereby, even when the igniter is activated, almost all activation energy thereof acts for rupturing the rupturable plate without flowing into the second passage and gases in the first and second passages during inflator actuation do not interfere with each other.

The two retainers adjacent to each other in the axial direction can be realized as a first retainer existing outside the pressurized medium accommodation chamber and a second retainer existing inside the pressurized medium accommodation chamber. In this case, the rupturable plate can be held between the first retainer and the second retainer.

If the first retainer is disposed such that a distal end portion of the igniter is surrounded circumferentially by an axial one end portion thereof and the other end thereof contacts the rupturable plate, all activation energy generated by activation of the igniter is led to the rupturable plate to reliably rupture the rupturable plate.

It is desirable that the first retainer which guides activation energy of the igniter is formed to have a tapered portion in which the inner diameter becomes smaller as it gets closer to the rupturable plate. By forming the retainer in this manner, activation energy of the igniter can be concentrated to rupture more reliably the rupturable plate.

Further, by providing an end portion closing member constituting a portion of the inflator housing at an axial end portion of the housing, defining an igniter chamber inside the end portion closing member, and forming gas discharging passages penetrating radially the end portion closing member, assembling of the inflator can be facilitated. In this case, it is preferable that a peripheral edge portion of the rupturable plate is fixed to the end portion closing member by welding or the like.

The inflator of the present invention is preferably a hybrid inflator in which one or two combustion chambers for accommodating a gas generating agent are provided inside the housing. The combustion chamber can be provided either inside or outside the pressurized medium accommodation chamber, but desirably, the combustion chamber is provided in the pressurized medium accommodation chamber in order to effectively utilize a combustion gas or heat generated by combustion of the gas generating agent. When the combustion chamber is provided inside the pressurized medium accommodation chamber, the first passage can be provided between the igniter chamber and the combustion chamber.

In the hybrid inflator, when the igniter is activated, activation energy thereof ruptures the first rupturable portion of the rupturable plate existing in the first passage to reach the inside of the pressurized medium accommodation chamber and ignites and burns the gas generating agent in the combustion chamber.

In this series of operations, since the rupturable plate is held by the two retainers in the inflator of the present invention, when the first rupturable portion is ruptured, the rupturable plate no longer exists between the retainers, a clearance corresponding to the thickness of the rupturable plate is formed at the abutting portion of the retainers. When such a clearance is generated, combustion gas and combustion residue of the gas generating agent can flow out into the second passage through this clearance (hereinafter, referred to as "short-pass").

In view of the above, in the hybrid inflator according to the present invention, it is desirable to provide a passage closing member which is moved by a pressure in the pressurized medium accommodation chamber at actuation to close the short-pass between of the first passage and the second passage, formed between the retainers after the rupturable plate is ruptured. Thereby, combustion gas and combustion residue are prevented from short-passing to the second passage via the short-pass formed between the retainers. Particularly in the hybrid inflator, since the interior of the housing is temporarily under a high pressure by combustion of the gas generating agent, an effect obtained by closing the first passage by the passage closing member due to the pressure and preventing communication between the passages at the short-pass between the retainers is effective.

In order to close the communicating space between the first passage and the second passage after the rupturable plate is ruptured, desirably, the first passage in the combustion chamber side is closed within the second retainer. For this reason, it is desirable that the passage closing member is formed to have a size, a shape and a mass such as to be moved by a pressure inside the pressurized medium accommodation chamber activated at actuation of the inflator and to be capable of closing at least the first passage. As such a passage closing member, for example, a metal ball, a substantially conical metal member or the like can be used. The preferred shape of the member is a ball, because it can close the first passage securely regardless of the orientation of the member.

The passage closing member is disposed inside the pressurized medium accommodation chamber, and more desirably on the rupturable plate side of the combustion chamber. By disposing the member in this manner, the passage closing member receives a pressure of a combustion gas generated by combustion of the gas generating agent or a pressure inside the pressurized medium accommodation chamber increased by the combustion gas and is moved in the direction to close the short-pass formed between the retainers.

If the gas discharging passage and the short-pass formed between the retainers are close to each other, the combustion residue passing through the short-pass is discharged directly from the gas discharging port to the outside of the housing, and therefore, it is essential to close the short-pass by the passage closing member.

In order to close the first passage by the passage closing member, for example, among the two retainers forming the first passage, in the second retainer existing inside the pressurized medium accommodation chamber before activation in the rupturable plate side, a bent portion for forming an opening smaller than an inner diameter of the cylindrical peripheral wall portion thereof may be provided, and the bent portion and the passage closing member may be pressed against each other. Thereby, the combustion gas generated inside the combustion chamber is sealed between the bent portion and the passage closing member so that it is prevented from entering the short-pass between the retainers toward the second passage.

As a result, all the gas for inflating an air bag, including the combustion gas of the gas generating agent, is discharged from the gas discharging ports through the second passage. Thus, a hybrid inflator in which a combustion gas is not discharged directly is provided. Further, as all the operating gas passes through the second passage, the combustion residue generated by combustion of the gas generating agent strikes against an inner wall of the housing or the like and is removed from the operating gas at the time of being discharged from the combustion chamber to pass through the second passage, substantially eliminating the discharge of combustion residue from the gas discharging ports of the hybrid inflator.

In order to make the combustion residue generated by combustion of the gas generating agent remain in the housing more effectively, it is desirable to provide multiple gas flow direction changes. For example, when a through hole for discharging combustion gas from the combustion chamber is formed on a peripheral surface of the cylindrical container defining the combustion chamber, it is desirable that the through hole is formed in a direction perpendicular to the inner surface of the housing or at least two flow direction changing portions for changing a direction of a gas flow is provided in a passage of the combustion gas from the combustion chamber to the gas discharging port.

Further, in order to ignite the gas generating agent more reliably, it is desirable that a transfer charge ignited and burned by the activation energy of the igniter is disposed at any position in the combustion chamber. In this case, in order to improve ignition of the transfer charge ignited by the igniter, it is desirable that no obstacle to movement of the activation energy of the igniter, such as a passage closing member exists between the rupturable plate and the transfer charge.

In the inflator of the present invention constituted as described above, since all the gases flowing inside the housing flows in one direction and a flow of one gas is not disturbed by the flow of another gas, the gas flows in the housing are not disturbed and flow in one direction. As a result, the gas for inflating an air bag can be discharged efficiently.

Further, when the inflator of the preset invention is a hybrid inflator, by providing the first passage and the second passage separately, a combustion flame or a combustion gas of the gas generating agent can be utilized further effectively and a flame or hot gas generated by combustion of the gas generating agent is not directly discharged, so that activation safety is enhanced. In particular, since the first passage for guiding activation energy of the igniter is provided inside two retainers axially adjacent to each other and it is extended to the interior of the pressurized medium space by the second retainer, the activation energy of the igniter is guided even in the pressurized medium accommodation chamber. As a result, it is convenient to ignite the gas generating agent disposed inside the pressurized medium accommodation chamber. That is, such a features of the present invention that the rupturable plate is held by two retainers and one of the retainers exists in the pressurized medium accommodation chamber is especially suitable for the hybrid inflator, because the activation energy of the igniter can be guided into the combustion chamber in the pressurized medium accommodation chamber.

As the pressurized medium in the present invention, a conventionally known material can be used, and one having a composition which comprises an inert gas such as argon, helium or the like (nitrogen is also included in the inert gas in the present invention) and that does not include oxygen substantially can be used. In this case, the argon works to promote the thermal expansion of the pressurized medium. It is preferable to contain helium in the pressurized medium since the leakage of the pressurized medium can be detected easily, and consequently distribution of imperfect products can be prevented. A charging pressure of the pressurized medium is preferably 10,000 to 70,000 kPa and more preferably, 30,000 to 60,000 kPa.

Further, when the inflator of the present invention is a hybrid inflator, a conventionally known gas generating agent can be used. Incidentally, in order to remove the combustion residue more effectively, it is desirable to use a gas generating agent which generates a combustion product having a melting point higher than the discharging temperature of the gas generated by combustion of the gas generating agent. By relating the discharging temperature of the gas generated from the gas generating agent and the melting point of the combustion residue contained in the combustion gas to each other, the generation of a slag-like combustion residue can be promoted. By making a gas including the slag-like combustion residue strike against an inner surface of the housing or the like, the combustion residue can be removed from the gas. In particular, when the second passage is provided to surround the first passage and the second passage is formed to allow a gas to pass, the combustion residue included in the gas strikes against a wall surface of the second passage to be collected, which is desirable.

The discharged gas temperature of the gas generating agent can be obtained from a tank internal pressure (actually measured value), an amount of generated gas, and a specific heat of the generated gas generally when the gas generating agent is burned inside a tank having a predetermined volume. When the melting point of the residue becomes sufficiently higher than the discharged gas temperature (not less than 110° C., preferably not less than 500° C.), the combustion residue is easily solidified and agglomerated (slag-like), so that it remains in the inflator and is suppressed from being discharged out of the inflator.

As the gas generating agent in the present invention, for example, it is possible to use one including fuel and an oxidizing agent, or fuel, an oxidizing agent and a slag-forming agent, being mixed with a binder if required, and formed into a desired shape. If such a gas generating agent is used, a gas generated by combustion of the agent can be used for inflating and deploying the air bag together with the pressurized medium. Particularly when the gas generating agent including the slag-forming agent is used, since it becomes easier to form a slag, an amount of mist-like combustion residue discharged from the inflator can be largely reduced. However, when an amount of the gas generating agent to be charged is small and an amount of the residue to be generated is small, the slag-forming agent may not be desirable for gas generating efficiency.

Preferably, the fuel can be one or two or more selected from the group constituting guanidine derivatives such as nitroguanidine (NQ), guanidine nitrite (GN), guanidine carbonate, amino nitro guanidine, amino guanidine nitrate, amino guanidine carbonate, diamino guanidine nitrate, diamino guanidine carbonate, and triamino guanidine nitrite. Further, as fuel, one or two or more selected from the group consisting of tetrazole and tetrazole derivatives can be used.

Preferably, the oxidizing agent can be one or two or more selected from the group consisting of strontium nitrate, potassium nitrate, ammonium nitrate, potassium perchlorate, copper oxide, ferrous oxide, and basic copper nitrate.

Preferably, the slag-forming agent can be one or two or more selected from the group consisting of acid clay, talc, bentonite, diatomaceous earth, kaolin, silica, alumina, sodium silicate, silicon nitride, silicon carbide, hydrotalsite, and a mixture thereof.

Preferably, the binding agent can be one or more selected from the group consisting of sodium salt of carboxymethyl cellulose, hydroxyethyl cellulose, starch, polyvinyl alcohol, guar gum, microcrystal cellulose, polyacrylamide, and calcium stearate.

When the pressurized medium and the gas generating agent having the above-described compositions are used, it is preferable that a molar ratio (A/B) between an amount (A mol) of the pressurized medium and an amount (B mol) of gas generated due to combustion of the gas generating agent is adjusted to 0.2 to 10, and more preferably 0.4 to 4.

As described above, the charging amount of the pressurized medium can be reduced by adjusting the molar ratio between an amount of pressurized medium and an amount of a gas generated by combustion of the gas generating agent. Therefore, even when a volume of the inflator housing is reduced by making the pressurized medium accommodation space smaller (i.e., even when the length and/or width (diameter) of the housing is reduced), it is possible to maintain the pressure at the same level as that before the volume is reduced, without increasing the charging pressure (=internal pressure of the pressurized medium) of the pressurized medium. In the present invention, when the inflator is a hybrid inflator, a weight ratio (X/Y) of a weight (X) of the pressurized medium to a weight (Y) of the gas generating agent is preferably 0.1 to 7, and more preferably 0.5 to 5.

The present invention provides an inflator for inflating type safety system with a simple structure in which a gas for inflating an air bag can be reliably discharged and, even when a solid gas generating agent burnt to generate a gas is used, a flame or a gas generated by combustion of a gas generating agent can further be efficiently used without discharging a residue produced by combustion thereof to the outside of the housing, and that realizes reduction in size and weight with a simple structure, and also provides an air bag system using the same.

DETAILED DESCRIPTION OF THE PRESENT INVENTION

An embodiment of the present invention will be explained below with reference to the drawings.

Figure 1:
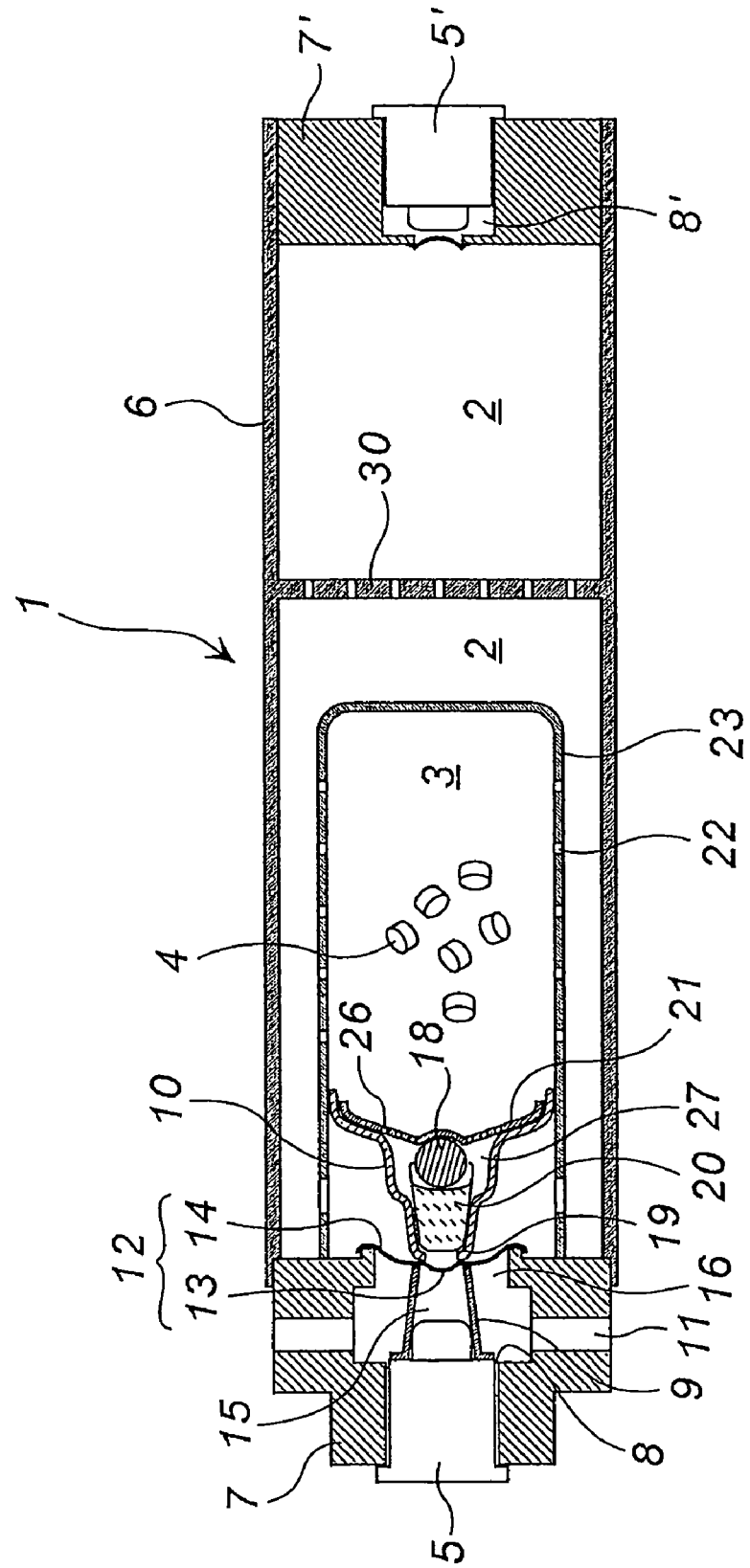
FIG. 1 is a cross-sectional view along an axial direction showing an embodiment of a hybrid inflator.
Figure 2:
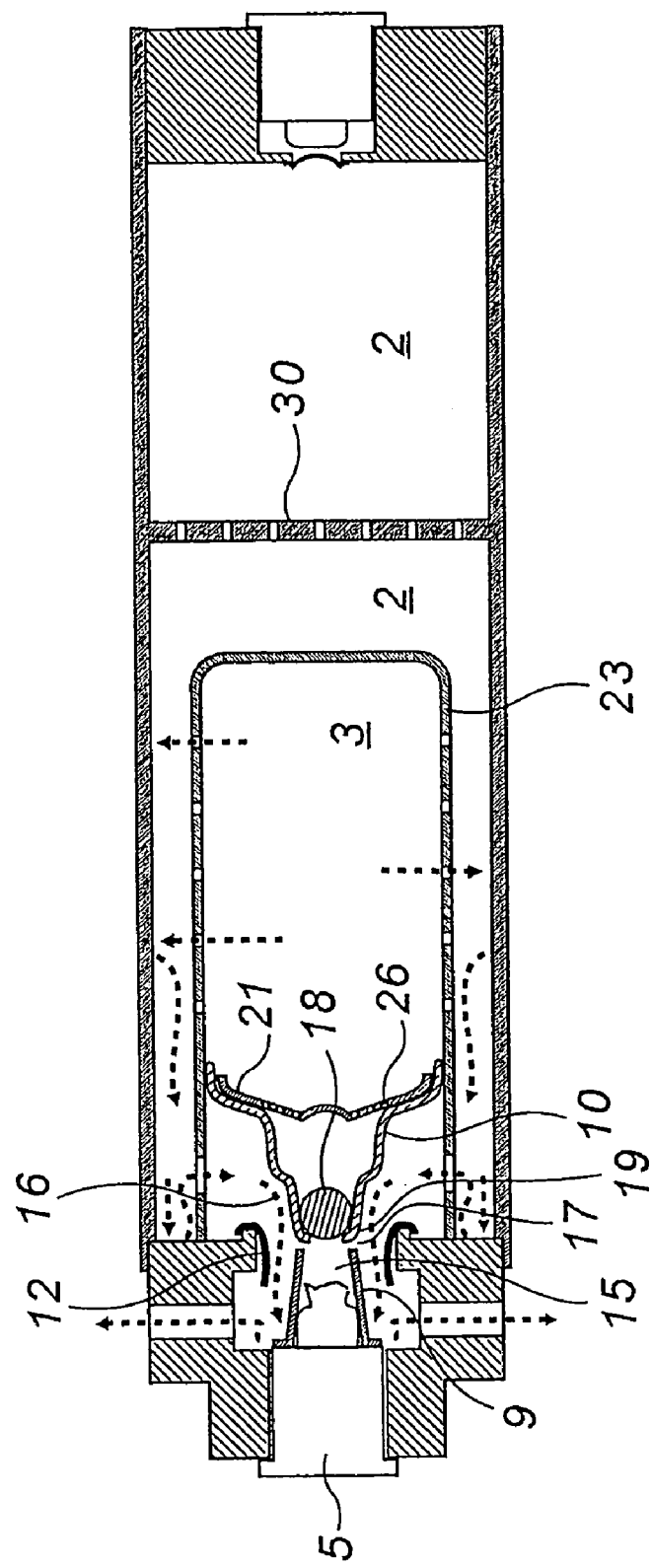
FIG. 2 is a cross-sectional view along an axial direction showing a state of the hybrid inflator in FIG. 1 after activation starts.

FIG. 1 is a cross-section of an inflator of the embodiment according to the present invention, and FIG. 2 is a cross-section showing a state of the inflator after activation starts.

An inflator according to the present embodiment is a hybrid inflator utilizing heat or gas generated by combustion of a solid gas generating agent 4 at a time of activation, and the inflator is a dual type (a multi-stage type) hybrid inflator provided with two igniters 5 and 5' which are activated independently.

In the hybrid inflator, a pressurized medium accommodation chamber 2 charged with a pressurized medium is provided in a cylindrical inflator housing 1, a combustion chamber 3 accommodating a gas generating agent 4 is provided inside the pressurized medium accommodation chamber 2, and igniters 5, 5' are arranged at respective axial end portions of the inflator housing 1.

The inflator housing 1 comprises a cylindrical member 6, which has the strength to withstand an increase in pressure generated inside the pressure chamber (namely, the pressurized medium accommodation chamber 2), and two end portion closing members 7, 7' for closing end openings thereof, and igniter chambers 8, 8' for accommodating, respectively, the igniters 5, 5' are provided inside the respective end portion closing members 7, 7'. Between the two end portion closing members 7, 7', the end portion closing member 7 (hereinafter, referred to as the first end portion closing member 7) is provided with gas discharging ports 11 radially extending through the first end portion closing member 7.

The pressurized medium accommodation chamber 2 is charged with an inert gas such as argon, helium or the like, and is closed by a rupturable plate 12 mounted on an internal end surface of the first end portion closing member 7 so as to maintain the accommodation chamber 2 in a sealed state. A partition wall 30 provided to axially divide the pressurized medium accommodation chamber into two is disposed inside the inflator housing 1. The partition wall 30 is provided with a plurality of through holes for communicating the divided spaces of the accommodation chamber 2 with each other.

A cylindrical container 23 provided on its peripheral surface with a plurality of through holes 22 is disposed inside the pressurized medium accommodation chamber 2, and is charged with a gas generating agent 4 to serve as a combustion chamber 3. Products of combustion such as flame, heat, combustion gas and the like generated by combustion of the gas generating agent 4 are discharged from the through holes 22 of the cylindrical container 23 into the pressurized medium accommodation chamber 2. As the gas generating agent 4, a conventionally known material can be used, but, more preferably, a material which does not produce a product (liquid type, solid type, semi-solid type or the like) other than gas at activation, or a material which generates a combustion product (combustion residue) removed by combustion gas striking against an inner surface of the housing 1 is suitably used. Especially, the cylindrical container 23 provided with the through holes 22 is arranged to face an inner surface of the cylindrical member 6 constituting the housing 1, and the through holes 22 are formed perpendicularly to the inner surface of the cylindrical member 6, and thereby, the combustion residue discharged from the through holes 22 collides against the inner surface of the cylindrical member 6 so as to be removed. Further, in this embodiment, the combustion gas, which has changed its flow direction after striking against the inner surface of the housing 1, strikes against the first end portion closing member 7 this time to change its flow direction. That is, the inner surface of the cylindrical member 6 and the first end closing member 7 constituting the housing 1 serve as the direction changing portions, and the combustion residue included in the combustion gas is removed by the change of the flow direction.

Two retainers 9, 10 are provided to be connected from the igniter (hereinafter, referred to as a first igniter 5) provided in the first end portion closing member 7 toward the inside of the housing 1. The two retainers 9, 10 are both provided with substantially cylindrical and coaxial peripheral wall portions. The rupturable plate 12, which seals (hermetically, as shown) the pressurized medium accommodation chamber 2, is interposed between and juxtaposed with the retainers 9, 10. In this embodiment, the retainer 9 existing outside the pressurized medium accommodation chamber 2, namely, existing closer to the igniter 5 than the rupturable plate 12 is defined as a first retainer 9, and the retainer existing inside the pressurized medium accommodation chamber 2 is defined as a second retainer 10.

A first passage 15, divided by the rupturable plate 12 for guiding actuation energy (a flame, a gas, an impact wave and the like) of the igniter 5 is commonly provided inside the first retainer 9 and the second retainer 10. Externally of the first and second retainers 9 and 10 is a second passage 16, likewise divided by the rupturable plate 12, for guiding an operating gas for inflating an air bag, is defined by the first and second retainers 9, 10 and the inner peripheral wall of the first end portion closing member 7. That is, the first passage 15 and the second passage 16 are defined internally and externally, respectively, of the two retainers 9, 10.

In this embodiment, particularly, the first retainer 9 for guiding the activation energy of the igniter 5 to the rupturable plate 12 is formed with an inclining portion in which the inner diameter of its substantially cylindrical peripheral wall is tapered to a reduced diameter as it gets closer to the rupturable plate 12. Thereby, the activation energy of the igniter 5 can be concentrated to more effectively rupture the rupturable plate 12. The tapered portion may be provided, if desired, only in the vicinity of juxtaposition with the rupturable plate 12 of the first retainer 9.

As the rupturable plate 12 sealing the pressurized medium accommodation chamber 2, a single metal plate formed in a circular shape is used, and the first passage 15 and the second passage 16 are closed by the single metal plate (the rupturable plate 12). Since the rupturable plate 12 is formed as a single piece held between the two retainers 9, 10, it is prevented from bulging (deforming) toward the pressurized medium accommodation chamber 2 at the time of receiving the actuation energy of the first igniter 5, even if it is not welded at the periphery of the first passage 15. Moreover, even if a break such as a notch is not pre-formed, the rupturable plate 12 can reliably be ruptured at a time of activation of the igniter 5. In order to prevent expansion of the rupturable plate 12 at the time of receiving the actuation energy of the first igniter 5 and to rupture the rupturable plate securely, it is desirable that an inner diameter of the first passage 15 and of the first retainer 9 where the latter makes contact with the rupturable plate 12 and an inner diameter of the second retainer 10 at that rupturable plate 12 are approximately the same. Furthermore, the inner diameter of the second retainer 10 can be larger by approximately the thickness of the first retainer 9 at that portion where the second retainer 10 makes contact with the rupturable plate 12, as shown in FIG. 3.

Figure 3:
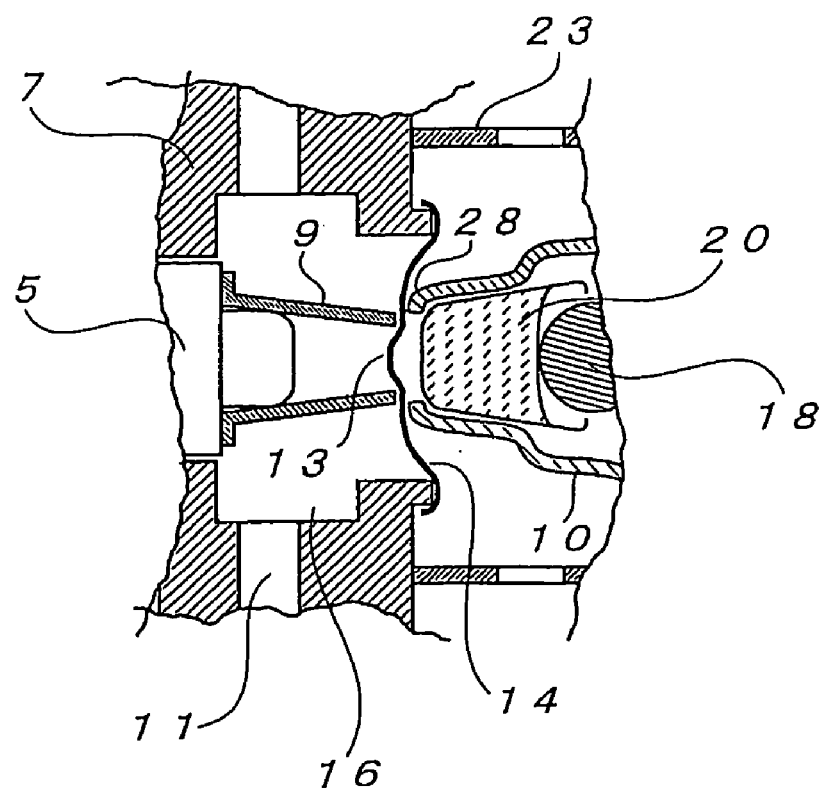
FIG. 3 is a cross-sectional view of a principal portion showing an activation starting state of the hybrid inflator.
Figure 4:
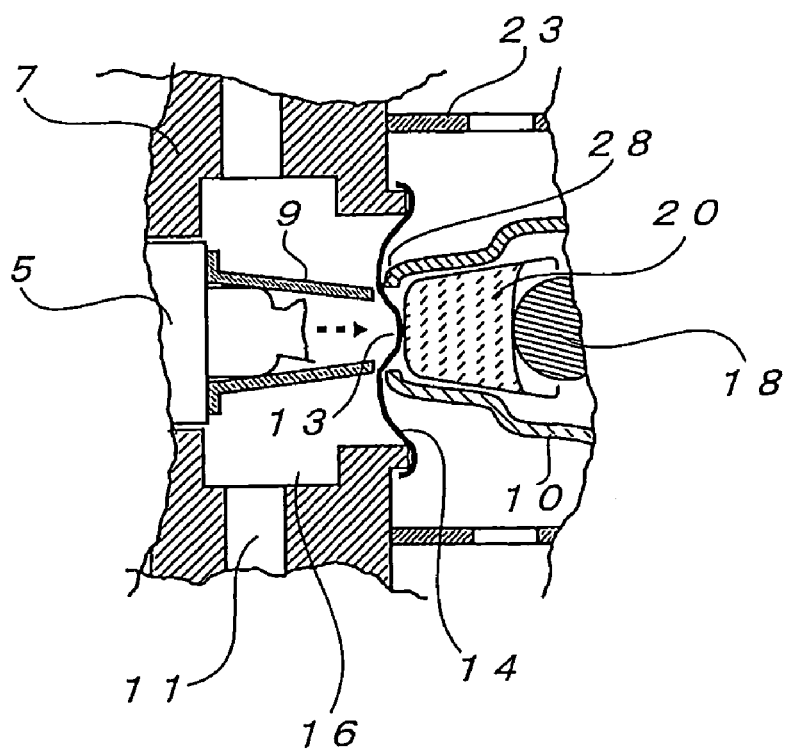
FIG. 4 is a cross-sectional view of the principal portion showing an activation starting state of the hybrid inflator.
Figure 5:
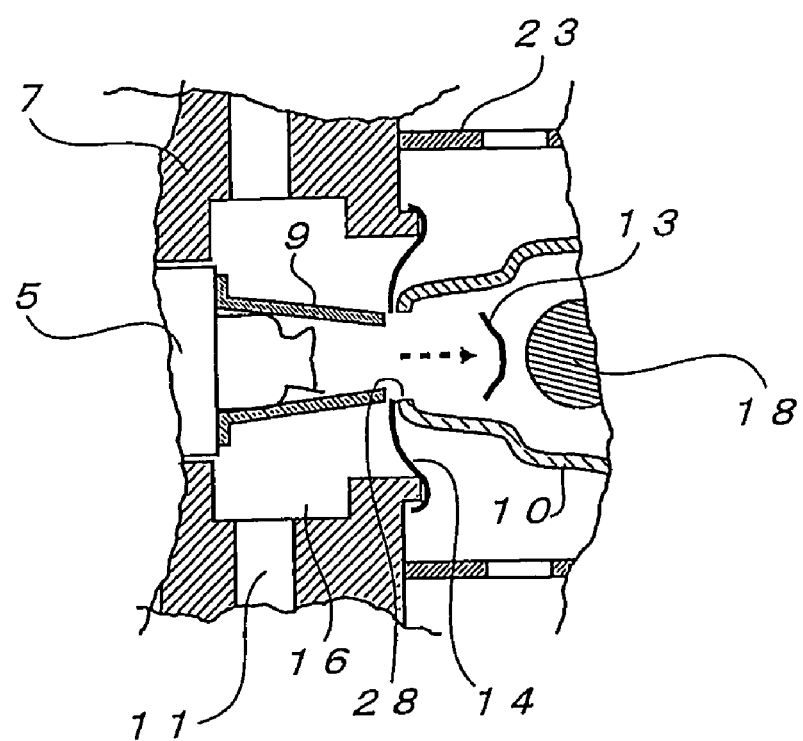
FIG. 5 is a cross-sectional view of the principal portion showing an activation starting state of the hybrid inflator.

At this time, as shown in FIG. 3, the rupturable plate 12 is deformed and pressed against the first retainer 9 by the pressure of the pressurized medium. In this state, when the first igniter 5 is activated, the activation energy thereof overcomes the pressure of the pressurized medium, so that a first rupturable central portion 13 of the rupturable plate 12 deforms to bulge toward the combustion chamber 3 (namely, toward the pressurized medium accommodation chamber 2) as shown in FIG. 4. At this time, the rupturable plate 12 comes in contact with a juxtaposed edge portion 28 of the second retainer 10 so that the edge portion 28 acts to prevent deformation of the entire rupturable plate 12. Furthermore, when energy from the igniter is applied to the first rupturable portion 13, the first rupturable portion 13 is sheared at the edge portion 28 to be cut off. At this time, the first rupturable portion 13 is cut off almost as a whole, as shown in FIG. 5. In this case, a shape of a portion to be cut off may be jaggedly cut off mainly at the portion corresponding to the edge portion 28 in the rupturable plate.

A second rupturable plate portion 14 results from the separation of the first portion 13, receives pressure of the pressurized medium and further ruptures to permit pressure medium to exit through the second passage 16. Thereby, a communicating space 17 between the first and second passages 15 and 16 such as shown in FIG. 2, may occur at the adjacent opposed end portions of the first and second retainers 9, 10 which were previously juxtaposed with the rupturable plate 12.

In view of the above, as shown in FIG. 2, a passage closing metal ball member 18 which moves under pressure from the pressurized medium acts to close the communicating space 17 between the first passage 15 within the second retainer 10 and the second passage 16 after rupture of the rupturable plate 12 occurs. The metal ball 18 is provided inside the combustion chamber 3 before activation of the inflator, as shown in FIG. 1, and it receives pressure at a time of combustion of the gas generating agent 4 or pressure of the activated pressurized medium and moves in a direction to close the communicating space 17 after activation of the inflator, as shown in FIG. 2.

A bent portion 19 which tightly contacts the moved metal ball 18 to close the first passage 15 is provided closer to the pressurized medium space 2 than the communicating space 17 in the first passage 15 (specifically, inside the second retainer 10), and a short-pass of the operating gas or the combustion residue from the first passage 15 to the second passage 16 is prevented by pressing the bent portion 19 and the metal ball 18 against each other. A dashed line shows the flow of gas in FIG. 2.

A transfer charge 20 which is ignited and burnt by activation energy of the igniter 5 is disposed inside the first passage 15 in the second retainer 10 and the metal ball 18 is pressed and supported together with the transfer charge 20 by a supporting member 21 defining an internal wall of the combustion chamber 3. A recess for receiving part of the metal ball 18 is formed in the supporting member 21, and the metal ball 18 is received in the recess and is thus prevented from moving before activation. The metal ball 18 is not in contact with the second retainer 10 to be directly supported by the second retainer 10, and a clearance 27 is provided between the metal ball 18 and the second retainer 10. The clearance 27 serves to direct a flame from the transfer charge 20 to the combustion chamber 3. Incidentally, in order to direct the flame of the transfer charge 20 into the combustion chamber 3, plural through holes 26 are formed in the supporting member 21 or the supporting member 21 is formed by using a wire mesh.

An operation of the inflator according to this embodiment will now be described. When the first igniter 5 is activated upon receipt of an activation signal, the first igniter 5 generates activation energy which reaches the first rupturable portion 13 through the first passage 15 within the first retainer 9 thereby rupturing the same. At this time, the second rupturable portion 14 also receives the pressure of the pressurized medium and is ruptured, so that the pressurized medium accommodation chamber 2 is put in communication with the outside of the housing 1 via the second passage 16 and the gas discharging passages 11. Almost simultaneously with rupture of the second rupturable portion 14, the activation energy of the igniter 5 ignites the transfer charge 20 provided inside the second retainer 10 and a flame therefrom passes through the first passage 15 inside the second retainer 10 to ignite and burn the gas generating agent 4 inside the combustion chamber 3. The pressure inside the pressurized medium accommodation chamber 2 increases due to combustion of the gas generating agent 4 and, simultaneously therewith, the metal ball 18 receives a combustion gas generated by the gas generating agent 4 or a pressure of the pressurized medium which moves the metal ball 18 in the direction in which the rupturable plate 12 existed, to closely contact the bent portion 19 of the second retainer 10 to close the first passage 15. As a result, all the combustion gas generated in the combustion chamber 3 and the pressurized medium (operating gas) is constrained to pass through the second passage 16 to be discharged from the gas discharging passages 11. Since the flow-direction changing portion (the inner surface of the cylindrical member 6 and the first end portion closing member 7) for changing the flow direction of a gas is provided in the passage of the operating gas inside the housing 1, the combustion residue contained in the gas is removed so that a clean gas is discharged. Further, since all of the combustion gas passes through the interior of the pressurized medium accommodation chamber 2, heat or the combustion gas due to combustion of the gas generating agent 4 can effectively be utilized.

In the inflator housing 1, the second igniter 5' fixed to the second end portion closing member 7' is activated if required, simultaneously with the first igniter 5 or with a slight delay.

Incidentally, in the present embodiment, the inflator with two igniters 5, 5' is described. However, the inflator according to the present invention can further employ a structure having only the left half portion in FIG. 1, namely, a single type structure constituted with only the left half portion (in the side in which the combustion chamber exists) with a solid end wall in place of the partition wall 30. Furthermore, even in a structure without using the generating agent 4, it is possible to rupture the first rupturable portion 13 and the second rupturable portion 14 by gas, heat, an impact wave or the like generated by activation of the igniter 5 by the structure in which the first retainer 9 and the second retainer 10 hold the both sides of the rupturable plate. In this case, since no residue occurs, a metal ball is not required to constrain the gas to assume changes in flow direction.

An air bag system of the present invention can be manufactured by incorporating the above-described hybrid inflator. That is, it is an air bag system provided with activation-signal outputting means comprising an impact sensor and a control unit, and a module including a module case accommodating the hybrid inflator and an air bag. The hybrid inflator is connected to the activation-signal outputting means (the impact sensor and the control unit) at the first and second igniters 5, 5' existing at respectively opposite ends of the housing 1 and the inflator is connected and fixed in the module case mounted with an air bag by screwing a stud bolt. Then, in the air bag system having such a structure, it is possible to adjust the amount of gas generation and an inflating speed of the air bag according to the magnitude of an impact by properly setting the sequencing of activation-signal outputting conditions in the activation-signal outputting means.

The hybrid inflator of the present invention can be applied to various inflators such as an inflator for an air bag for a driver side, an inflator for an air bag for a passenger side next to the driver, an inflator for a side air bag, an inflator for a curtain air bag, or the like.

The invention claimed is:
1. An inflator for a safety system for a vehicle, comprising:
   an inflator housing having a gas discharging port, the inflator housing defining therein a pressurized medium accommodation chamber charged with a pressurized medium, and an igniter chamber for accommodating an igniter;

a first retainer having a first cylindrical peripheral wall portion;

a second retainer having a second cylindrical peripheral wall portion arranged in alignment with said first cylindrical peripheral wall portion;

said first and second retainers having opposed substantially juxtaposed ends, and said first cylindrical peripheral wall portion and said second cylindrical peripheral wall portion defining, inside thereof, a first passage for guiding activation energy from said igniter towards said pressurized medium accommodation chamber, and defining, outside thereof, a second passage, extending between the gas discharging port and the pressurized medium accommodation chamber, for guiding said pressurized medium to said gas discharging port, the first passage being provided independently from the second passage at least prior to activation of the inflator; and a single rupturable plate extending through a communicating space, formed between said opposed substantially juxtaposed ends of said first and second retainers for sealing said pressurized medium accommodation chamber from said igniter chamber and said discharging port.

2. The inflator according to claim 1, wherein said first passage and said second passage are closed by said single rupturable plate.

3. The inflator according to claim 1 or 2, wherein said single rupturable plate includes, a first rupturable portion closing said first passage, and a second rupturable portion closing said second passage, and said igniter is accommodated in said igniter chamber such that said igniter is positioned directly opposite said first rupturable portion via said first retainer.

4. The inflator according to claim 3, wherein said igniter generates activation energy when ignited and said first rupturable portion directly receives said generated activation energy from said igniter and is ruptured by said activation energy.

5. The inflator according to claim 1 or 2, wherein said first retainer and said second retainer limit deformation or bulging of said single rupturable plate towards said pressurized medium accommodation chamber while being ruptured by said activation energy of said igniter.

6. The inflator according to claim 1 or 2, wherein the first retainer and the second retainer are provided adjacent to each other in an axial direction of the inflator housing, the first retainer is provided outside the pressurized medium accommodation chamber and a second retainer is provided inside the pressurized medium accommodation chamber.

7. The inflator according to claim 6, wherein said first retainer includes a first end portion circumferentially surrounding a distal end portion of said igniter, and a second end portion contacting said single rupturable plate.

8. An inflator according to claim 1 or 2, wherein said inflator housing includes an end portion closing member forming one end portion of the inflator housing, said end portion closing member defining the igniter chamber and being provided with a gas discharging passage including said gas discharging port penetrating the end portion closing member in a radial direction of the inflator housing.

9. The inflator according to claim 8, wherein said single rupturable plate is fixed to a peripheral portion of said end portion closing member.

10. The inflator according to claim 1 or 2, further comprising:

a combustion chamber accommodating therein a gas generant ignited and burned by said activation energy of said igniter, said combustion chamber being in communication with said first passage and also in communication with said pressurized medium accommodation chamber; and a passage closing member which blocks communication between said second passage and said combustion chamber through said second retainer upon activation of said inflator and after said single rupturable plate is ruptured.

11. The inflator according to claim 10, wherein said combustion chamber is provided inside the pressurized medium accommodation chamber, said first passage is provided between said igniter and said combustion chamber, and said passage closing member is provided inside said first passage and between said rupturable plate and said combustion chamber.

12. The inflator according to claim 10, wherein said combustion chamber is defined by a cylindrical container disposed inside said pressurized medium accommodation chamber, and said cylindrical container has a plurality of through holes that direct combustion gas perpendicularly toward an inner surface of said inflator housing.

13. An inflator according to claim 12, wherein the entire said combustion gas generated inside the combustion chamber by said gas generant is discharged from said gas discharging port through said plurality of through holes provided in said combustion chamber.

14. The inflator according to claim 10, wherein at least two flow direction changing portions for changing a flow direction of said combustion gas generated inside said combustion chamber are provided in a passage for directing said combustion gas to said gas discharging port.

15. The inflator according to claim 10, wherein said second retainer is provided inside said pressurized medium accommodation chamber and has a bent portion provided at an end portion opposing said first retainer, said bent portion having a diameter smaller than an inner diameter of said first passage therein, such that said bent portion engages with said passage closing member to block communication between said second passage and said combustion chamber through said second retainer.

16. The inflator according to claim 1 or 2, wherein said first retainer gradually reduces in diameter from said igniter toward said rupturable plate.

17. An air bag system comprising:

activation-signal outputting means including an impact sensor and a control unit;

a module case accommodating an inflator according to claim 1 or 2; and an air bag.

18. An inflator for a safety system of a vehicle, comprising:

an inflator housing having a gas discharging port, the inflator housing defining therein a pressurized medium accommodation chamber charged with a pressurized medium, and an igniter chamber for accommodating an igniter;

a first retainer having a first cylindrical peripheral wall portion defining, therein, a first passage for guiding activation energy from said igniter towards said pressurized medium accommodation chamber, and defining, outside thereof, a second passage, for guiding said pressurized medium to said gas discharging port;

a second retainer having a second cylindrical peripheral wall portion arranged in alignment with said first cylindrical peripheral wall portion, said second peripheral wall portion defining, therein, an extension of said first passage, and defining, outside thereof, a part of said second passage;

said first and second retainers having opposed substantially juxtaposed ends;

a single rupturable plate extending through a communicating space, formed between said opposed substantially juxtaposed ends of said first and second retainers for sealing said pressurized medium accommodation chamber from said igniter chamber and said discharging port;

a combustion chamber accommodating therein a gas generant ignited and burned by said activation energy of said igniter, said combustion chamber being in communication with said first passage and also in communication with said pressurized medium accommodation chamber; and a passage closing member which blocks communication between said second passage and said combustion chamber through said second retainer upon activation of said inflator and after said single rupturable plate is ruptured, wherein said single rupturable plate includes a first rupturable portion closing said first passage and a second rupturable portion closing said second passage, and said second rupturable portion is ruptured by at least one of a pressure of said pressurized medium and a pressure of said combustion gas generated by said gas generant.

19. An inflator for a safety system of a vehicle, comprising:

an inflator housing having a gas discharging port, the inflator housing defining therein a pressurized medium accommodation chamber charged with a pressurized medium, and an igniter chamber for accommodating an igniter;

a first retainer having a first cylindrical peripheral wall portion defining, therein, a first passage for guiding activation energy from said igniter towards said pressurized medium accommodation chamber, and defining, outside thereof, a second passage, for guiding said pressurized medium to said gas discharging port;

a second retainer having a second cylindrical peripheral wall portion arranged in alignment with said first cylindrical peripheral wall portion, said second peripheral wall portion defining, therein, an extension of said first passage, and defining, outside thereof, a part of said second passage;

said first and second retainers having opposed substantially juxtaposed ends;

a single rupturable plate extending through a communicating space, formed between said opposed substantially juxtaposed ends of said first and second retainers for sealing said pressurized medium accommodation chamber from said igniter chamber and said discharging port;

a combustion chamber accommodating therein a gas generant ignited and burned by said activation energy of said igniter, said combustion chamber being in communication with said first passage and also in communication with said pressurized medium accommodation chamber;

a passage closing member which blocks communication between said second passage and said combustion chamber through said second retainer upon activation of said inflator and after said single rupturable plate is ruptured;

a transfer charge provided inside said cylindrical peripheral wall portion of said second retainer and inside said pressurized medium accommodating chamber and adapted to be ignited and burned by said activation energy of said igniter; and a supporting member provided inside said combustion chamber, wherein said transfer charge is urged against said cylindrical peripheral wall portion of said second retainer by said supporting member and said passage closing member.

20. An inflator for a safety system of a vehicle, comprising:

an inflator housing having a gas discharging port, the inflator housing defining therein a pressurized medium accommodation chamber charged with a pressurized medium, and an igniter chamber for accommodating an igniter;

a first retainer having a first cylindrical peripheral wall portion defining, therein, a first passage for guiding activation energy from said igniter towards said pressurized medium accommodation chamber, and defining, outside thereof, a second passage, for guiding said pressurized medium to said gas discharging port;

a second retainer having a second cylindrical peripheral wall portion arranged in alignment with said first cylindrical peripheral wall portion, said second peripheral wall portion defining, therein, an extension of said first passage, and defining, outside thereof, a part of said second passage;

said first and second retainers having opposed substantially juxtaposed ends;

a single rupturable plate extending through a communicating space, formed between said opposed substantially juxtaposed ends of said first and second retainers for sealing said pressurized medium accommodation chamber from said igniter chamber and said discharging port;

a combustion chamber accommodating therein a gas generant ignited and burned by said activation energy of said igniter, said combustion chamber being in communication with said first passage and also in communication with said pressurized medium accommodation chamber; and a passage closing member which blocks communication between said second passage and said combustion chamber through said second retainer upon activation of said inflator and after said single rupturable plate is ruptured, wherein said passage closing member is a metal ball disposed inside said second retainer inside said pressurized medium accommodation chamber, and an inner diameter of a portion of said second retainer is larger than an outer diameter of said metal ball to provide a non-activated position for said ball.

* * * * *